No. 863,366. PATENTED AUG. 13, 1907.
P. DICK.
APPARATUS FOR MOLDING GOLF AND OTHER PLAYING BALLS.
APPLICATION FILED JULY 16, 1903.

Witnesses:
Q. J. Eagle.
L. Douville.

Inventor:
Peter Dick.
By Diedersheim Fairbanks.
Attorneys

UNITED STATES PATENT OFFICE.

PETER DICK, OF EDINBURGH, SCOTLAND.

APPARATUS FOR MOLDING GOLF AND OTHER PLAYING BALLS.

No. 863,366. Specification of Letters Patent. Patented Aug. 13, 1907.

Application filed July 16, 1903. Serial No. 165,736.

*To all whom it may concern:*

Be it known that PETER DICK, a subject of the King of Great Britain, residing at No. 19 South St. Andrew street, Edinburgh, Scotland, brass-founder, has invented certain new and useful Improvements Relating to Apparatus for Molding Golf and other Playing Balls, of which the following is a specification.

This invention relates to apparatus for use in molding balls composed of plastic material, such as golf and other playing balls; the objects being to render the apparatus portable and of such a character as to enable the operation of re-molding golf-balls to be carried out in places remote from manufacturing centers and by unskilled operators.

According to this invention, a pair of molding dies are provided with a screw or other device for enabling the requisite pressure to be exerted upon the dies, the said pressure device, together with the dies, constituting a compact and portable apparatus for the purpose in view.

In order that the said invention may be clearly understood and readily carried into effect, I will proceed to describe the same more fully with reference to the accompanying drawings, in which:—

Figure 1:
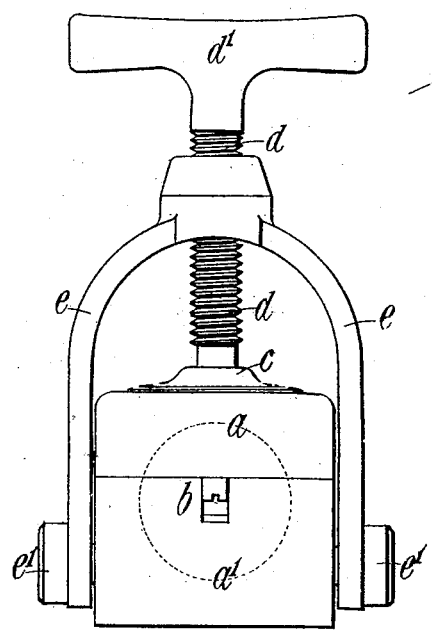
Figure 2:
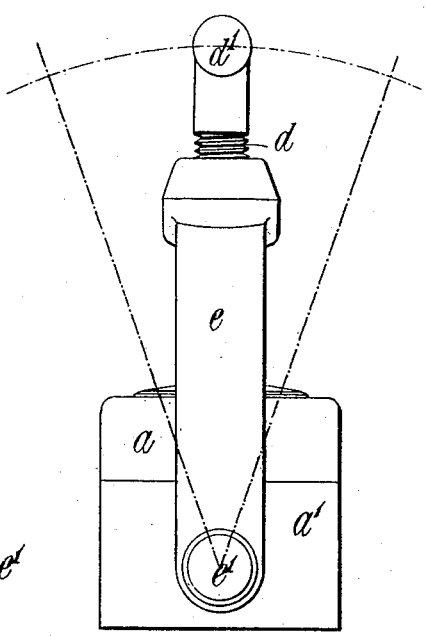
Figure 4:
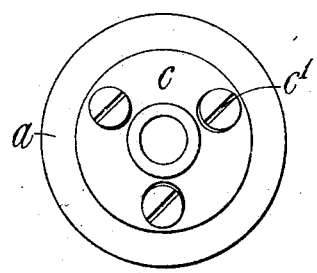
Figure 3:
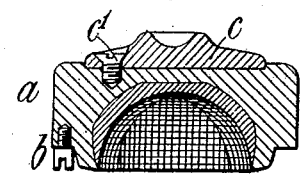

Figures 1 and 2 represent respectively a front and a side elevation; Figs. 3 and 4 being respectively a section and a plan of the upper die detached.

The apparatus comprises a pair of dies $a\ a'$ which may be of the usual construction and, either partially or entirely, composed of gun metal, iron or steel; the dies being provided with a register $b$ whereby their true alinement is insured. The upper die $a$ is furnished on its exterior with a hard metal boss or bearing $c$ which may be secured by means of screws $c'\ c'$ and which serves as a seating for the end of the screw $d$. The latter is arranged to work through the crotch of a bifurcated carrier or stirrup $e$ whereof the lower extremities are pivotally attached at $e'\ e'$ to each side of the lower die $a$. The screw $d$ is furnished with a handle $d'$ whereby it may be rotated, or other means, such as a hand-wheel, may be provided for effecting the rotation of the screw.

When it is desired to renew or re-mold a golf-ball, the stirrup $e$ is moved approximately through an angle of 90°, that is to say, from the vertical position shown in Figs. 1 and 2 to an approximately horizontal position. The dies $a\ a'$ are now separated and the ball to be operated upon, having been softened by immersion in hot water, is placed in the lower die $a'$. The upper die $a$ is then replaced, its accurate adjustment being insured by means of the register $b$. Having thus inserted the ball and adjusted the dies $a\ a'$ the stirrup is returned to the vertical position and the requisite pressure applied by means of the screw $d$ acting upon the hard matal boss $c$ with which the upper die $a$ is provided.

It will be seen that the pressure exerted by the screw is received directly upon the hard metal boss or bearing $c$ which latter is preferably recessed for the reception of the extremity of the screw. The die being preferably constructed of gun-metal, if the screw were arranged to take a direct bearing thereon it would have the effect of quickly wearing away the die.

Instead of the screw-carrier or stirrup $e$ being pivotally attached to the lower die, the crotch may be so arranged that the screw may be withdrawn a sufficient distance to permit of the die $a$ being lifted and removed from between the legs of the stirrup, the latter being rigidly attached to the lower die.

According to a further modification, the stirrup may be rigidly attached to the lower die and be furnished with guides for engaging the upper or movable die; the latter being attached to the extremity of the screw in such a manner as to rise or fall simultaneously therewith according to the direction in which the screw is rotated.

For the purpose of the present specification, I have found it convenient to refer to a particular construction of molding apparatus. It will, however, be readily understood that I may employ molding dies of any other appropriate construction.

What I claim and desire to secure by Letters Patent of the United States is:—

In a golf ball molding apparatus, the combination of a die having a lower portion and an upper portion adapted to receive the ball, a boss or bearing of hard metal removably secured to the upper face of said upper portion and adapted to reinforce the same, a depression in said boss, trunnions extending from said lower portion, a stirrup piece pivotally mounted on said trunnions and movable with respect thereto, an internally screw threaded boss formed on the crutch of said stirrup piece, a screw adapted to work therethrough and bear against said boss and enter said depression for holding the parts in proper position, a registering pin projecting from the face of the upper die and having a recess therein, and a recess in the upper face of the lower die adapted to receive said registering pin.

In testimony whereof I have hereunto set my hand in presence of two subscribing witnesses this 27th day of January, 1903.

PETER DICK. [L. S.]

Witnesses:
WALTER OLIPHANT,
WM. EATON CLURIE.